(12) United States Patent
Chatfield

(10) Patent No.: US 6,944,274 B1
(45) Date of Patent: Sep. 13, 2005

(54) DYNAMICALLY CONFIGURED VOICE MAIL SYSTEM

(76) Inventor: William Nelson Chatfield, 8103 Greenslope Dr., Austin, TX (US) 78759

(*) Notice: Subject to any disclaimer, the term of this patent is extended or adjusted under 35 U.S.C. 154(b) by 0 days.

(21) Appl. No.: 10/791,183

(22) Filed: Mar. 2, 2004

(51) Int. Cl.[7] .................................................. H04M 1/64
(52) U.S. Cl. .............................. 379/88.18; 379/88.16; 379/88.22
(58) Field of Search ......................... 379/67.1, 71, 73, 379/74, 75, 76, 77, 78, 88.13, 88.14, 88.16, 379/88.17, 88.18, 88.22, 88.27, 201.01

(56) References Cited

U.S. PATENT DOCUMENTS

| | | | | |
|---|---|---|---|---|
| 5,568,539 A | * | 10/1996 | Bergsman et al. | 379/88.22 |
| 5,802,526 A | * | 9/1998 | Fawcett et al. | 379/88.13 |
| 6,014,427 A | * | 1/2000 | Hanson et al. | 379/88.18 |
| 6,014,429 A | * | 1/2000 | LaPorta et al. | 379/88.01 |
| 6,516,059 B1 | | 2/2003 | Shaffer et al. | 379/211.02 |
| 6,580,784 B2 | | 6/2003 | Rodriguez et al. | 379/88.12 |
| 6,587,547 B1 | * | 7/2003 | Zirngibl et al. | 379/88.17 |
| 6,622,137 B1 | | 9/2003 | Ravid et al. | 706/47 |
| 6,658,464 B2 | | 12/2003 | Reisman | 709/219 |

* cited by examiner

*Primary Examiner*—Ovidio Escalante
(74) *Attorney, Agent, or Firm*—David Henry

(57) ABSTRACT

A dynamically configured voice mail system which allows customers to send digital information through a number of different sources into a user's voice mail system. The dynamically configured voice mail system prioritizes the customer's information and converts this information into audio messages using known technology. Subsequently, the user may retrieve prioritized audio messages and take action on said audio messages by simply pressing one or more buttons on the telephone keypad. Keypad actions may be dynamically and uniquely configured for each audio message, depending on the appropriate actions intended by the sender for the recipient.

2 Claims, 5 Drawing Sheets

DATABASE 1

| RECORD IDENTIFIER | IN-BOX NAME | IN-BOX USER ID | IN-BOX DATE |
|---|---|---|---|
| 100 | Ryan Johnson | UserID 45832 | 01.16.2004 |

*Fig. 4*

DATABASE 3

| RECORD IDENTIFIER | USER ID | ACTION LOOKUP KEY | PROCESS 1 | PROCESS 2 | ADDRESS FOR PROCESS |
|---|---|---|---|---|---|
| 1011 | 45832 | A1 | PLAY | | |
| 1011 | 45832 | A2 | DELETE | | |
| 1011 | 45832 | B1 | PLAY | | |
| 1011 | 45832 | B2 | FORWARD | | |
| 1011 | 45832 | B3 | DELETE | | |
| 1011 | 45832 | C1 | PLAY | | |
| 1011 | 45832 | C2 | CALL | DELETE | assistant@baylor.edu |
| 1011 | 45832 | C3 | DELETE | | |
| 1022 | 45832 | A1A | CALL | | 2543664300 |
| 1022 | 45832 | A2A | DELETE | | |
| 1022 | 45832 | A1B | CALL | | 5125551256 |
| 1022 | 45832 | A2B | DELETE | | |
| 1022 | 45832 | B1A | email | | 566manager@store.com |
| 1022 | 45832 | B2A | DELETE | | |
| 1022 | 45832 | B1B | email | | 312manager@store.com |
| 1022 | 45832 | B2B | DELETE | | 5125555899 |
| 1022 | 45832 | C1A | DELETE | | |

*Fig. 6*

DATABASE 2

| RECORD IDENTIFIER | USER ID | OPTIONS TREE ORDER | OPTIONS TREE ORDER | OPTIONS TREE MESSAGE | ACTION 1 (KEYPAD #1) | ACTION 1 MESSAGES | ACTION 2 (KEYPAD #2) | ACTION 2 MESSAGES | ACTION 3 (KEYPAD #3) | ACTION 3 MESSAGES |
|---|---|---|---|---|---|---|---|---|---|---|
| 101 | 4583 2 | A | 1 | YOU HAVE 2 STORES THAT HAVE A CASH SHORTAGE | A1 | PRESS 1 TO HEAR CASH STORAGE MESSAGES | A2 | PRESS 2 TO DELETE CASH STORAGE MESSAGES | | |
| 101 | 4583 2 | B | 1 | YOU HAVE 2 STORES THAT ARE BEHIND PLAN | B1 | PRESS 1 TO HEAR MESSAGES OF STORES BEHIND PLAN | B2 | PRESS 2 TO FORWARD THESE MESSAGES TO YOUR ASSISTANT AND DELETE MESSAGE FROM YOUR INBOX | B3 | PRESS 3 TO DELETE STORE PLAN MESSAGES |
| 101 | 4583 2 | C | 1 | YOU HAVE 3 MEETINGS SCHEDULED ON YOUR CALENDAR | C1 | PRESS 1 TO HEAR CALENDAR MESSAGES | C2 | PRESS 2 TO CALL YOUR ASSISTANT | C3 | PRESS 3 TO DELETE CALENDER MESSAGES |
| 102 | 4583 2 | A1 | 1 | STORE 309 HAS A CASH SHORTAGE OF $156 | A1A | PRESS 1 TO CALL THE STORE MANAGER | A2A | PRESS 2 TO DELETE THIS MESSAGES | | |
| 102 | 4583 2 | A1 | 2 | STORE 311 HAS A CASH SHORTAGE OF $87 | A1B | PRESS 1 TO CALL THE STORE MANAGER | A2B | PRESS 2 TO DELETE THIS MESSAGES | | |
| 102 | 4583 2 | B1 | 1 | STORE 568 IS 17% BEHIND PLAN | B1A | PRESS 1 TO ESCALATE TO THE STORE MANAGER | B2A | PRESS 2 TO DELETE THIS MESSAGES | | |
| 102 | 4583 2 | B1 | 2 | STORE 312 IS 3% BEHIND PLAN | B1B | PRESS 1 TO ESCALATE TO THE STORE MANAGER | B2B | PRESS 2 TO DELETE THIS MESSAGES | | |
| 102 | 4583 2 | C1 | 1 | YOU HAVE A 12:00 METING WITH YOUR BOSS AT 12:00. YOU HAVE A 1:00 MEETING WITH DAVID HENRY IN THE BLUE CONFERENCE ROOM. YOU HAVE A 3:00 MEETING WITH A FRIEND. | C1A | PRESS 1 TO DELETE THIS MESSAGES | | | | |

*Fig. 5*

DYNAMICALLY CONFIGURED VOICE MAIL SYSTEM

BACKGROUND OF THE INVENTION

1. Field of the Invention

The present invention relates to a method for integrating and prioritizing business data and audio messaging in order to enable a user to perform business-related processes directly from a voice mail, e-mail, web browser, or text messaging system.

2. Background Information

Currently, there are a number of viable ways to send and receive information or data in a business-related environment. Several of the most prominent methods of sending and receiving data are e-mail (computer-to-computer), fax (phone-to-phone), database data-transfer (computer-to-computer), and pager services (phone-to-phone or e-mail-to-phone). It has become increasingly vital that business professionals possess the updates to the most recent business data in order to make informed and well-reasoned decisions. For example, the use of wireless networks, video-conferencing, portable e-mail devices (i.e. BLACKBERRY brand devices), and cell-phone applications have become common tools associated with running a business effectively and in keeping employees in touch with customers and other employees.

According to some recent studies, employees should achieve 55 minutes extra work per day this year with the usage of wireless e-mail services. Further studies indicate that 24% of business end-users believe that push-to-talk voice calling, wireless IM and wireless video conferencing could increase their overall work productivity. Recently, Federal Reserve Chairman Alan Greenspan stated that advances in technology lie behind much of the U.S. economy's growth over the past 10 years. In addition to producing more widgets, information technology has prompted speed, quality improvements, customer service, and new products.

One of the major downfalls of technology in the workplace is technology's ability to accelerate the pace of work and of communication beyond what humans are able to bear. A recent survey found that an overwhelming majority of business employees believe that they are physically incapable of responding to the vast amount of information received each day —via e-mail, database transfer, pager, and cell-phone. With the advent of so many means of communication, users can easily become lost and overwhelmed at the amount of information they are required to process and use each work day. To further exacerbate the problem, the use of numerous software and hardware packages has made the integration of the information needed to run a business difficult, if not impossible. Recently, many experts have criticized the use of high-technology in communication in regard to productivity. In its simplest form, the concept of productivity consists of two elements: the value of goods produced divided by the number of hours worked. According to Robert Solow, a Nobel prize winner from M.I.T the computer age can be seen everywhere except in the productivity statistics. Countless number of hours of productivity are wasted on sorting through various pieces of data for the one piece of information that is critically important to the user at that very moment. Research done by Purdue University's School of Technology found that workers may accomplish more tasks with the advent of new technology without actually improving productivity. In other words, workers may simply be getting the wrong things done faster. Although the technology used to increasing the flow of communication has progressed immensely, it has failed to progress at the same speed in assisting workers with critical management skills, such as: identifying priorities, managing time, planning, and delegating. Further, a worker's productivity has become highly dependant upon their relative ability to manage priorities and effectively plan their time, especially in an environment where more information and technology is thrown at a worker than ever in the history of the working world.

Like so many technologies today, voice mail has tremendous potential to help employees to communicate quicker, to get more done, and to be more productive from remote locations. However, the current use of voice mail is inadequate at integrating and prioritizing vast amounts of data, such that the user can make informed business decisions and perform real-time business processes through the voice mail system. The typical business professional is able to use their voice mail services on their cell phone merely for receiving information from a caller or, in some cases, from a small electronic message (a "text message"). Businesses are even using portable e-mail devices (a "blackberry") to keep their employees in touch with customers and other employees. But the current voice mail methods are not dynamic. Such methods do not provide users with automatically prioritized information, drawn pro-actively or passively from multiple data sources. Nor does the current voice mail technology allow a user to perform business processes from remote locations. Finally, current voice mail technology is inadequate at pulling in data from a number of data sources, as is required in today's environment.

A method is needed, utilizing voice messaging systems, to integrate relevant, real-time business data from numerous sources, categorizing and prioritizing that data, so that the business professional can adequately perform business processes from remote locations.

SUMMARY OF THE INVENTION

In view of the foregoing, it is an object of the present invention to provide a system and method for facilitating business management and/or transactions by persons remote from their places of employment.

It is another object of the present invention to provide a system and method for providing mobile business persons with specifically targeted business information via telephone (or other audible information transceiver device, such as an internet "phone" device).

It is another object of the present invention to provide a system and method for by which an information transmitter can convey information to remote recipients in a manner which, according to the transmitter's preferences specified in a conveyed data unit's parameters, is available to the recipient in a hierarchical or categorized manner according to such transmitter's preferences.

It is another object of the present invention to provide a system and method as just described, wherein the system presents each recipient with audible control options for selecting information to be received and/or transmitter-enabled actions to undertake in response to such selected and received information, such options being exercised by touch tone selections via a recipient's telephone.

In satisfaction of these and related objects, the present invention provides a Dynamically Configured Voice Mail System ("DCVMS") which creates a new way of working by allowing the user to not only receive key metric information via audio messages, but also allowing the user to then take some additional action to resolve or drive the business process further. In other words, the DCVMS solution will extend current business processes by providing a user access and the capability to process (take action on) business and personal data from anywhere and anytime via a phone.

The DCVMS provides a robust method of collecting relevant, real-time business data from numerous sources, categorizing and prioritizing that data, so that the business professional can adequately perform business process from remote locations. Furthermore, the use of this device will increase the productivity of the modern worker.

The DCVMS also has applications beyond the business community. It will provide a more robust way for family and friends to not only leave messages for a recipient but to also select what actions the recipient may take after hearing a message. As merely one example, one family member can now, in addition to leaving a message for another family member to pick up the family dog at the groomer, also enter an option for the recipient to, for example, press #1 on the phone keypad to call the groomer to ask if the dog is ready to be picked up, or press #2 on the phone keypad to call the sender's cell phone.

Examples of additional applications are far too numerous to contemplate, much less list here.

BRIEF DESCRIPTION OF THE DRAWINGS

FIG. 4 is an illustration of data contained within database 1 of the preferred embodiment.

FIG. 5 is an illustration of data contained within database 2 of the preferred embodiment.

FIG. 6 is an illustration of data contained within database 3 of the preferred embodiment.

DETAILED DESCRIPTION OF THE PREFERRED EMBODIMENT

Figure 3:
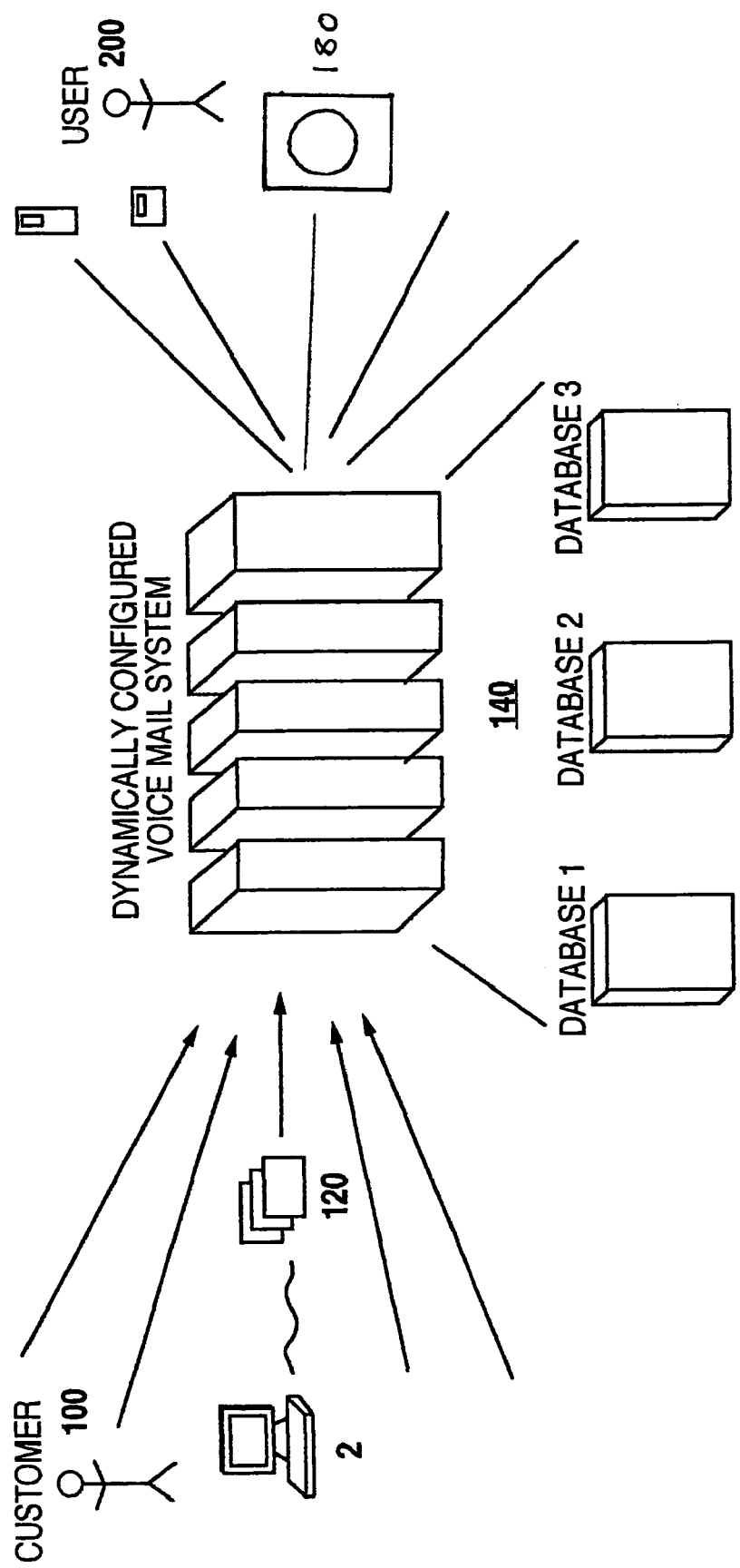
FIG. 3 is a block diagram which represents the preferred embodiment of the disclosed invention.

The Dynamically Configured Voice Mail System is identified generally by FIG. 3, a block diagram for the Dynamically Configured Voice Messaging System (DCVMS).

Figure 1:
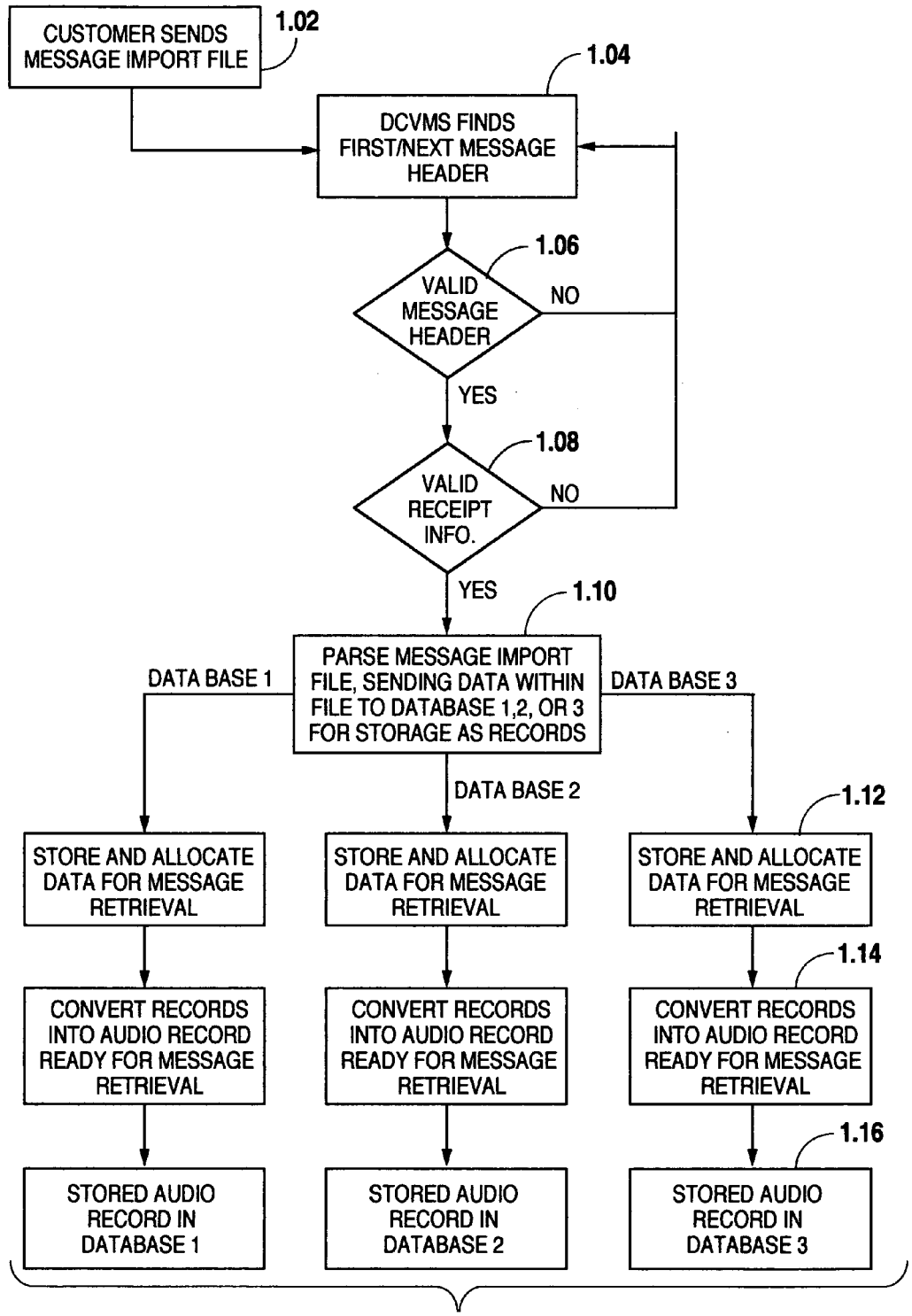
FIG. 1 is a process flow chart for the method steps in the import process of the preferred embodiment.

Generally, the process begins when a message import file 120 is received by DCVMS system 140, as illustrated in FIG. 3. First, the message import file is sent by a transmitting entity ("customer") 100 to DCVMS 140 for processing, as illustrated in FIG. 1. In the preferred embodiment, DCVMS 140 will allow for message import file 120 to be received from a customer 100 by ERP, Accounting, Data Warehouse, or other data system, and message import file 120 may be in any of the following formats: ASCII Flat File, XML, EDI, or any other data format files available or requested by the customer. In the preferred embodiment, DCVMS 140 will receive message import file 120 either by providing an FTP web site in which customers 100 may log on and place message import files 120 in their allotted DCVMS 140 directory, or by pro-actively obtaining message import file 120 at customer-defined intervals, giving customer 100 the option of scheduling DCVMS 140 system to go to a particular Internet site or customer's Intranet to retrieve message import file 120.

DCVMS 140 will persistently observe customer's FTP web site folders for arriving message import files 120 for processing. In the preferred embodiment, DCVMS 140 will process message import file 120 in batches when DCVMS 140 sees that message import file 120 has arrived.

Upon receiving message import file 120, DCVMS 140 finds a message header (1.04), as illustrated in FIG. 1. Next, DCVMS 140 attempts to validate the message header in order to process message import file 120 properly (1.06). If message header is invalid, then DCVMS 140 re-attempts next message header location and validation (1.06). Upon message header validation, DCVMS 140 next attempts validation of the information within message import file 120 (1.08). If message information is not valid, then DCVMS 140 attempts to find next message header (1.04), repeating the previous steps as illustrated in FIG. 1. However, if said message information is valid, DCVMS 140 parses message information to determine message destination (1.10), as described below.

Upon receiving and initially processing message import file 120, as previously described, DCVMS 140 opens, reads, and processes message import file 120 (1.10). DCVMS 140 allocates data within message import file 120 to three databases: database 1, database 2, and database 3 (1.10).

In the preferred embodiment, database 1 will store the mailbox user's name and user ID or password, as illustrated in FIG. 4. Consequently, database 1 will notify DCVMS 140 if user 200 has any messages when message retrieval process is undertaken by user 200, as illustrated in FIG. 2.

Database 2, in the preferred embodiment, receives message or information to be conveyed to user 200, a customer-defined message tree hierarchy whereby messages are to be presented to user 200 in a customer-prescribed order (1.12), and action option information pertaining to choices ("action messages") to be presented to user 200 upon receipt of any one unit of information. In this process, DCVMS 140 parses message import file 120 into message text as well as one or more action messages (up to 99), as illustrated in FIG. 5. Thus, database 2 will contain both message text and one or more action messages with each options tree message to be presented to user 200 upon message retrieval, as illustrated in FIG. 2. Once data from message import file 120 is received and initially processed by DCVMS 140, information to be presented to user 200 is converted into voice-synthesized audio messages, using known technology, that will be loaded to the correct location in the users voice mail in box options tree (1.14).

Figure 2:
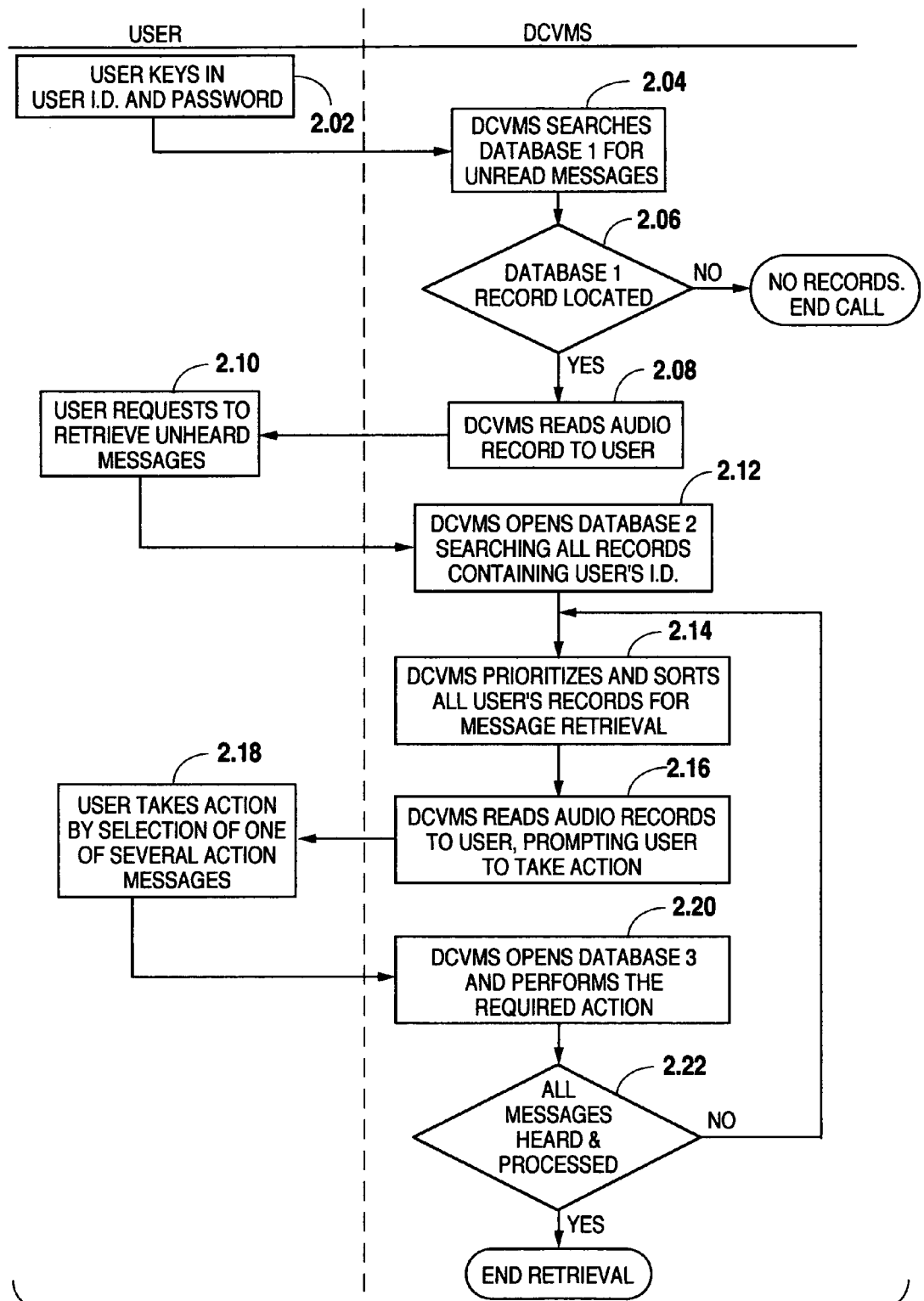
FIG. 2 is a process flow chart for the method steps in the voice mail retrieval process of the preferred embodiment.

DCVMS will configure user's 200 voice mail in box with selectable options per the information from the customer's data file, as illustrated in FIG. 2.

Database 3, in the preferred embodiment, will instruct DCVMS 140 as to the chosen action when user 200 is listening to a message and presses a key on the phone keypad 180, as illustrated in FIGS. 2 & 6. In the preferred embodiment, DCVMS 140 will use Boolean logic to open message import file 120, read through message import file 120, and load data within message import file 120 into database 1, database 2, or database 3, creating retrievable records.

The action options may range, for example, from retrieving and hearing additional information to be reported audibly, recording a message to be conveyed to some third party, causing a data file to be transmitted to user 200 (such as by fax, e-mail, etc.) or to some third party, or to place a telephone call to a particular individual of relevance to the information or task at hand, and/or any other action options task that the transmitter 100 has conveyed via the message import file 120.

The following description expounds the message retrieval process in the preferred embodiment, as illustrated by FIG. 2. In the preferred embodiment, in order to access messages, user 200 will key in their user ID and corresponding user password (2.02). In response, DCVMS 140 will search database 1 for unread messages for user 200 (2.04). If DCVMS 140 locates a record in database 1 (2.06), DCVMS 140 will then read said audio record to user 200 and provide user 200 with response options (2.08). After listening to their options, user 200 will then request DCVMS 140 to retrieve unheard messages (2.10). DCVMS 140 will then open database 2, searching for all records which contain user's ID (2.12). Next, DCVMS 140 will prioritize and sort all record types for message retrieval (2.14) in order to present hierarchical audio messages to user 200 in the hierarchical order dictated by the message import file 120. DCVMS 140 will then read options tree audio messages to user 200 (2.16). User will then respond by selecting one of several action messages (2.18). When user 200 selects action message by pressing a key or multiple keys on phone pad 180, DCVMS 140 will then open database 3 and perform the required action (2.20). The receiving message process, as illustrated in FIG. 2, will continue until user 200 hangs up or has deleted all messages (2.22). In the preferred embodiment, DCVMS 140 will be hosted as an ASP solution and sold as a product offering that a 3rd party can run on their servers. The DCVMS 140 will also be sold as shrink wrap software to the general consumer public for private home/business use.

The present system allows an information transmitter (employer, consultant, secretary, company home office, family member, friend, etc.) to send a file, in the DCVMS file layout (format), from, for example, an Accounting, ERP, Data Warehouse, web page input, and any other data systems. The DCVMS is configured whereby the transmitter dictates intended recipients of particular information. The transmitter dictates, via the message import file layout, the allocation of messages to respective intended recipients, the hierarchical organization of messages to be presented (prescribed in the voice mail hierarchy tree), and which information/messages are to be converted to speech for audible delivery.

Furthermore, DCVMS allows the transmitter to prescribe action options for recipients upon receiving initial information delivery (i.e. what actions the system will take when the user 200 presses a key or keys on the phone keypad). As an example, the transmitter can export information regarding Expense issues from their accounting system. The transmitter can then transmit file(s) to DCVMS which creates messages for intended recipients that "there are Expense issues to resolve" as well as provides options or actions that the caller may take after hearing the message. As an example, after hearing there are Expense issues the caller could then be presented with the below options:

a. "Press #1 to hear the details on the Expense issues"
    b. "Press #2 to forward an e-mail to Accounting to request a detail report on the Expense issues"
    c. "Press #3 to delete this message"

The present system allows users to alert their employees, associates, friends, or family members in a real time manner, of any information, business issue, personal reminder, or business process that requires attention. This frees all such people from desks, or even Internet-linked laptop computers as a means, not just for learning of important (or merely convenient) information/issues, but taking appropriate action in response to such information, all simply by placing a telephone call and following instructions. As another example, a mobile executive may be responsible for payment of a particular invoice. His or her assistant could forward invoice information via the DCVMS system whereby the executive would be alerted to the issue, would be able to listen to all the details of the invoice, and then select an action option whereby payment of the invoice is approved and an appropriate message is sent to accounts payable. Another provided action option may be to place a call to the vendor, if there is an issue to be resolved prior to payment.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A system for disseminating and managing business information comprising:

data management means for receiving and disseminating transmitting entity-generated message import files, each said message import file including first parameters pursuant to which said data management means allocates a first portion of data from each respective said message import file according to intended recipient or recipients aggregations defined by said transmitting entity, second parameters pursuant to which a second portion of data representative of discrete messages or information units are presented to respective said intended recipients in a transmitter-defined hierarchical order, and third parameters pursuant to which a third portion of data representative of action options are presented to respective said intended recipients after receiving each of said discrete messages or information units;

said data management means further comprising voice synthesis means for, upon actuation by an intended recipient, generating audible speech in a format which is audibly perceptible by said intended recipients via an audible information transceiver device and which conveys, in speech form, said discrete messages or information units to said intended recipient and said action options;

said data management means further includes audible information transceiver interface means by which one or more intended recipients can access said data management means, and by actuating discrete input actuators of said audible information transceiver device as directed by speech patterns generated by said data management means, be presented first with first speech indicative of said discrete messages or information units and secondly with second speech representative of said action options.

2. A method for disseminating and managing business information comprising the steps of:

receiving into data management means a message import file from a transmitting entity, said import file having parameters indicative of the intended recipient or recipients of information reflected in said message import file, of data representative of messages or information units to be presented to respective said intended recipient or recipients, of a transmitter-defined hierarchical order in which said messages or information are to be presented to each said intended recipient, and of data representative of recipient-selectable action options to be presented to respective said intended recipients in association respectively with each of said messages or information units;

with said data management means, processing said message import file by parsing and writing data within said message import file to an intended recipient-accessible storage area configured for interactive access via an audible information transceiver interface means, for voice-synthesis-based dissemination to said intended recipients of audible-perceptible representations of said messages or information according to said transmitter-defined hierarchical order and of respectively associated said action options, and for data processing steps distinctly associated with, and in response to recipient-selected said action options as are communicated to said data management means via actuation by a said recipient of selection means of said audible information transceiver interface means;

upon access of said intended recipient-accessible storage area by an intended recipient via said audible information transceiver interface means, disseminating said audibly-perceptible representations of said messages or information units along with the associated said action options and receiving and accordingly effecting said data processing steps as are associated with the reception of input, via said audible information transceiver interface means, from an intended recipient and representative of the selection by said intended recipient of one of said action options associated respectively with each said message or information unit.

* * * * *